Nov. 25, 1941.  H. L. WILLKE  2,263,750

VALVE SEAT

Filed June 19, 1940

INVENTOR
Herbert L. Willke.
BY
Edward A. Lamana
his ATTORNEY

Patented Nov. 25, 1941

2,263,750

UNITED STATES PATENT OFFICE 2,263,750

VALVE SEAT

Herbert L. Willke, Toledo, Ohio, assignor to The National Supply Company, Pittsburgh, Pa., a corporation of Pennsylvania Application June 19, 1940, Serial No. 341,317

4 Claims. (Cl. 251—144)

This invention relates generally to valves and more particularly to valve seats and the manner of supporting and sealing the same.

This improvement is particularly advantageous for use in valves for slush pumps which are adapted to pump mud laden fluid under high pressure.

Slush pumps are provided for circulating mud laden fluid down through a drill string and up through the casing of a well for flushing out the drill cuttings. Very high pressures are required to circulate this fluid in deep wells and it requires the use of a heavy duty reciprocating pump having one or more valves in multiple. A valve approximately nine inches in diameter is subjected to pressures as high as four thousand pounds per square inch. These valves are ordinarily equipped with an annular valve seat, the outer perimetral surface of which is tapered and fits in a complementary tapered bore in the valve casing of the pump. In a relative short period of time impact due to the violent seating of the valves on their seats either loosens the tapered fit or destroys the valve ring seating surface or the surface of the casing bore and the fluid under high pressure will then leak therethrough. Since this fluid carries mud in suspension it is highly abrasive and in cases where the degree of bore taper and complementary valve ring taper are made a substantial amount to reduce the wedging action leakage occurs due to the difficulty of retaining such valve rings in their seats. In cases where the taper is reduced it is not uncommon for the valve to drive the ring through the casing bore, resulting either in the destruction of the ring or cracking the cylinder casing surrounding the bore.

In other instances where it is necessary to remove the valve ring which has been wedged into the casing bore beyond certain predetermined limits withdrawal of the ring is not only very difficult but when such withdrawal is accomplished there generally results a scoring of the surface in the casing bore, making it impossible to effect a satisfactory mating of the surfaces when a new ring is assembled therein.

The principal object of this invention is the provision of an improved valve structure which overcomes this detrimental action.

Another object is to provide a valve having a seat with dual sealing means.

Another object is the provision of a resilient packing which when assembled in the valve structure has the characteristics of a free body and is responsive to fluid pressure for sealing against leakage past the valve seat.

Another object is the provision of a packing chamber in a valve structure arranged to receive a resilient packing and which when assembled will deform the shape of the packing without subjecting it to material compression.

Another object is the provision of a metallic seal between the outer tapered periphery of the valve seat and the wall of the opening in which it is assembled, whereby the radial stress set up on the mating tapered surfaces is limited to a predetermined intensity to insure a permanent seal and prevent destructive wedging action.

Another object is to provide reinforcing means in the valve casing adjacent the tapered bore in which a valve seat is retained to increase the resistance to deformation of the casing when operating under load.

Another object is to provide means limiting the advancement of the valve seat into a tapered bore of a casing without extending its outer diameter, thereby limiting the diameter of the opening required in the roof of the discharge chamber of the casing through which the valve structure is passed when being assembled to operative position.

Other objects and advantages appear hereinafter.

In the accompanying drawing a practical embodiment illustrating the principles of this invention is shown wherein, Fig. 1 is a vertical section of a valve and its seat mounted in a slush pump casing illustrating the present invention.

Figure 1:
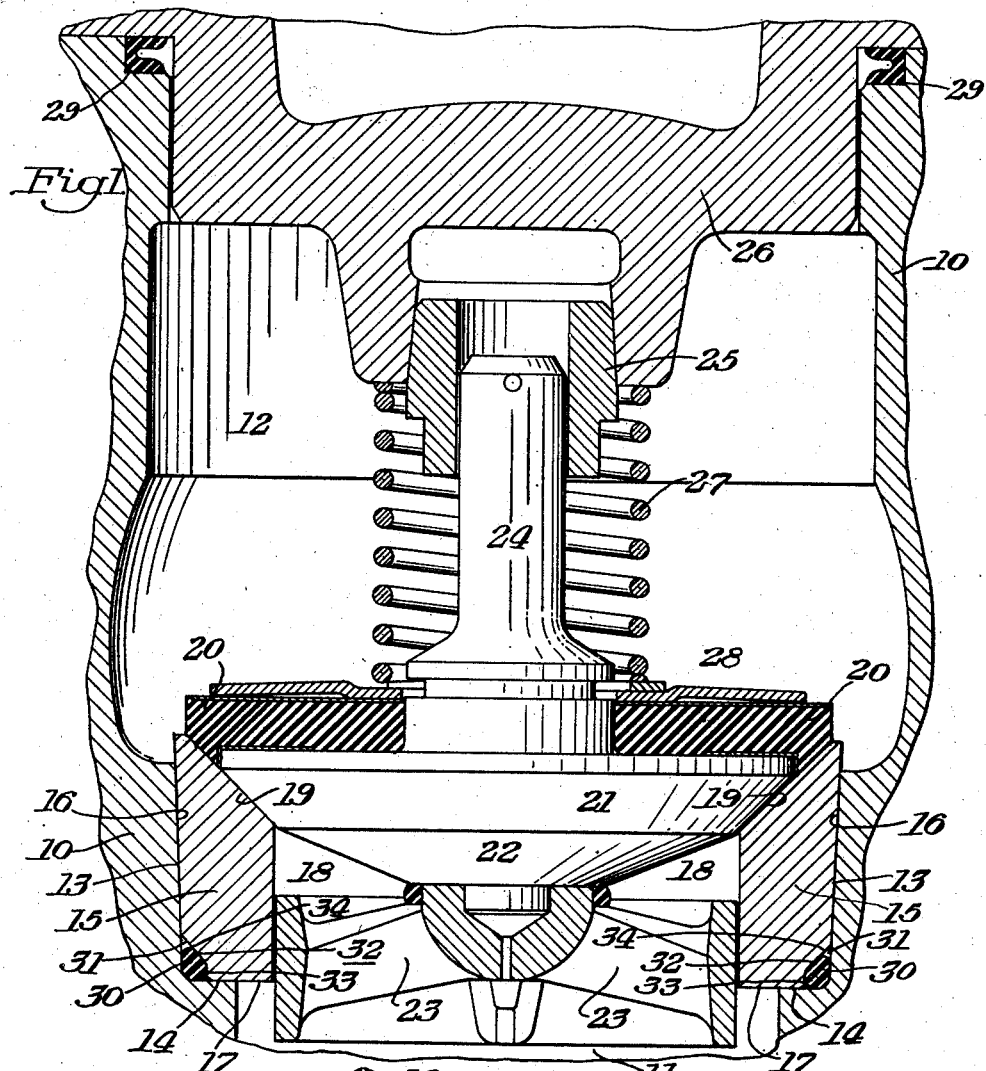

Referring to Fig. 1 of the drawing the valve casing 10, which in this instance is the water cylinder chamber deck of a slush pump, is provided with the intake or suction chamber 11 and the discharge chamber 12 with an opening therebetween. The upper portion of this opening has a tapered bore 13 which terminates at its lower end in the inwardly extending radial shoulder 14. The annular valve seat ring 15 has a perimetral tapered surface 16 complementary to the bore 13. These complementary surfaces mate in tight engagement within the elastic limit of metal when the lower end 17 of the valve seat ring is firmly seated on the shoulder 14. Care must be taken in preparing these parts to produce this condition.

The opening 18 through the valve seat ring is cylindrical and the inverted conical valve seat 19 is formed on its upper end for receiving the complementary surfaces of the rubber and metal portions 20 and 21 of the valve member 22. A spider 23 is secured to the under side of the valve member and is provided with radial extending projections arranged to engage the cylindrical surface of the opening 18 to guide the lower end of the valve member in its vertical travel. The valve member has an upwardly projecting stem 24 which is slidably received in the upper guide valve ring 25 mounted in the removable valve casing head 26. A coil spring 27 having one end bearing upon the head 26 and the other end upon the follower plate 28 is provided for urging the rubber portion 20 of the valve into sealing engagement with the metal portion 21 of the valve member and the valve seating surface 19. An annular expansible seal 29 is assembled between the valve head 25 and the casing 10.

As stated above, a valve approximately nine inches in diameter may be subjected to a pressure as high as four thousand pounds per square inch. The sealing ring being approximately ten and three-quarters inches in diameter and having an exposed area of ninety and eight-tenths square inches is thus subjected to a pressure load of three hundred and sixty-three thousand pounds. The metal to metal seal between the tapered surfaces of the valve seat ring and the casing is approximately nine and one-eighth inches in diameter at its upper end which has an exposed area of approximately sixty-six and two-tenths square inches and is subjected to a pressure load of approximately two hundred sixty-five thousand pounds. When these highly polished tapered sealing surfaces are subjected to the hammering action of the valve this high pressure load forces a vapor pressure between this metal to metal sealing contact. This vapor leakage is particularly annoying in cases where the sealing surfaces are stressed due to excessive wedging beyond the elastic limit of the materials used. In cases where an increasing volume of vapor continues to pass therethrough it is only a very short time before the mud laden fluid travels with the vapor and the tapered sealing surfaces are destroyed.

This detrimental action is materially reduced and in some cases entirely stopped by providing the shoulder 14 at the lower end of the bore 13 which functions to limit the travel of the seat ring 15 into the bore 13, thus holding the radial stresses set up in the seat ring and casing to a predetermined amount well within the elastic limit, thereby effectively transferring a large portion of the load on the seat ring from the tapered surface to the shoulder.

This shoulder 14 not only acts as a stop but also serves to reinforce the casing adjacent the bore 13 where it is most effective to resist the radial bursting stresses, as the material of the casing has lower physical properties, particularly as to elastic limit, than those of the seat ring.

To further resist this detrimental action an annular resilient packing 30 is placed between these tapered sealing surfaces to prevent the vapor from leaking therethrough. This packing is preferably constructed of rubber and is mounted in the path of the leakage flow without being subjected to material initial pressure. The packing is substantially a free body when assembled in its chamber. When vapor pressure leaks past the tapered sealing surfaces it is subjected to one side of the packing and causes it to flow and tightly seal the space between the members. This sealing action stops the flow of the vapor under pressure which is effective in preventing the abrasive fluid from entering between the tapered sealing surfaces and thus preserves the casing and the valve seat ring.

Figure 2:
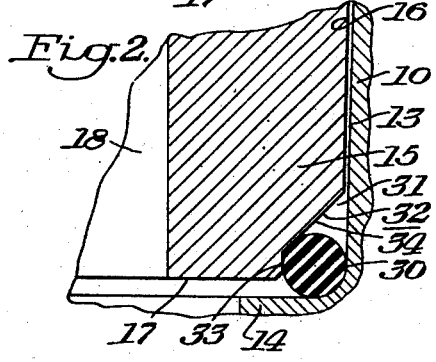
Fig. 2 is an enlarged fragmentary sectional view showing the relative position of the pump casing and the valve seat ring just before the latter is completely assembled therein.

The packing 30 is preferably made as an annular ring of circular cross section as illustrated in Fig. 2. The packing chamber is formed by providing a groove in one of the elements making up the tapered sealing surface. The packing chamber 31 illustrated in the drawing is formed by the groove 32 in the lower perimetral surface of the valve seat ring 15. This groove may be conveniently formed by two surfaces. The lower surface 33 is substantially cylindrical and its diameter is less than the diameter of the lower end of the tapered surface 13 by the amount of twice the diameter of the circular cross section of the packing ring 30. This permits the lower end of the cylindrical surface 33 to be lowered into the packing ring 30 before it is deformed. The lower edge of this surface is preferably beveled as shown to insure that it will not pinch the packing when assembled. The second surface 34 forming the groove is conical and is preferably disposed at an angle of forty-five degrees and extends from the cylindrical surface 33 to the tapered surface 16 of the valve seat ring 15. When the valve seat ring is being assembled in the valve casing the frusto conical surface 34 just engages the upper portion of the packing 30 and the lower end of the cylindrical surface extends into the ring and below the great diameter of its cross section as illustrated in Fig. 2.

The juncture between the tapered surface 13 of the casing and the shoulder 14 is preferably constructed to conform with the shape of the packing. The packing chamber is formed by grooving the inner concentric member. Since the packing 30 illustrated is circular in cross section the fillet between the tapered surface 13 and the shoulder 14 is preferably made to conform to the same radius as the cross section of the packing ring 30.

Figure 3:
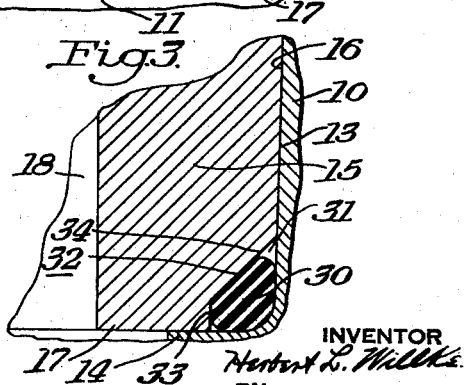
Fig. 3 is an enlarged fragmentary sectional view showing the deformed packing when the valve seat ring is completely assembled as illustrated in Fig. 1.

When the valve seat ring 15 is advanced from the position shown in Fig. 2 until it is properly seated on the shoulder 14 as shown in Figs. 1 and 3, the tapered metal sealing surfaces are pressed into tight engagement within the elastic limit of the material and the resilient packing element 30 is deformed by the frusto conical surface 34 within the chamber 31. This chamber is not completely filled by the deformed packing and the force creating this deformation produces an initial pressure between the packing and the walls of the chamber 31. Nevertheless the packing is substantially a free body within the chamber. Thus in cases where the vapor, under pressure, seeks its way between the tapered sealing surfaces into the upper portion of the chamber 31 it becomes effective on the packing and compresses it against the opposite end of the chamber and attempts to extrude it between the end of the valve seat ring 17 and the shoulder 14. The valve ring, being firmly seated on the shoulder and the cohesion of the resilient packing material prevent it from being extruded from the chamber. However the packing is pressed tightly against the walls of the chamber and the vapor pressure is prevented from leaking past this seal. This adds long life to the valve and the pump casing in which it is assembled.

The packing and the chamber may be constructed in many different shapes for producing this result. However the embodiment illustrated and described is believed to be the simplest and most economical to produce.

I claim:

1. In a valve structure, the combination of a valve casing provided with a tapered bore and a radial shoulder at the inner end of the bore, a valve seat member having perimetral surfaces complementary to the surfaces of said bore and shoulder and arranged to be forcibly inserted into said bore and against the shoulder producing a contact surface pressure in the bore within and near the elastic limit of the metal forming a metal to metal seal, the elements being contoured to provide an annular packing chamber walled by the bore and shoulder of the valve casing and perimetral surface of the valve seat member with a metal to metal seal at either side of the chamber, a resilient packing ring seated as a free body in said chamber and arranged to flow under pressure to complete the seal of the contacting surfaces of the valve casing and valve seat member, and a fluid actuated check valve cooperating with said valve seat.

2. In a valve structure, the combination of a valve casing provided with a tapered bore and a radial shoulder at the inner end of the bore, a valve seat member having perimetral surfaces complementary to the surfaces of the bore and shoulder and arranged to be forcibly inserted into said bore and against the shoulder producing a contact surface pressure in the bore within and near the elastic limit of the metal forming a metal to metal seal, a chamber formed with the wall of the bore and the shoulder by providing the inner end of the valve seat with a reduced cylindrical portion merging into the perimetral wall of the valve seat by a frusto-conical portion, a resilient packing ring within said chamber having the characteristics of a free body and arranged to flow as the result of pressure to complete the seal of the metal to metal sealing surfaces, and a fluid actuated check valve cooperating with said valve seat.

3. In a valve structure, the combination of a valve casing provided with a downwardly and inwardly tapering bore and a radial shoulder at the inner end of the bore, a valve seat member having perimetral surfaces complementary to the surfaces of said bore and shoulder and inserted therein with the inner end of the valve seat engaging the shoulder, said complementary surfaces being so proportioned that the wedging stresses set up in the ring and casing approximate but do not exceed the elastic limit of the casing or ring materials when the ring is seated on said shoulder, and a fluid actuated check valve cooperating with said valve seat.

4. In a valve structure, the combination of a valve casing provided with a tapered bore and a radial shoulder at the inner end of the bore, a valve seat member having surfaces complementary to the surfaces of the bore and shoulder and arranged to be forcibly inserted into said bore and against the shoulder producing a contact surface pressure in the bore within and near the elastic limit of the metal forming a metal to metal seal, an annular chamber formed by the bore and the shoulder with the valve seat member, an annular packing in said chamber having the characteristics of a free body and against which vapor under pressure passing between the contacting surfaces is effective to prevent vapor flow therebetween, and a fluid actuated check valve cooperating with said valve seat.

HERBERT L. WILLKE.